US011097630B2

(12) United States Patent
Freitag (10) Patent No.: US 11,097,630 B2
(45) Date of Patent: Aug. 24, 2021

(54) METHOD FOR MANAGING THE ENERGY DEMAND OF A CHARGING STATION FOR AN ELECTRIC VEHICLE (71) Applicant: BENDER GMBH & CO. KG, Gruenberg (DE)

(72) Inventor: Steffen Freitag, Gruenberg (DE)

(73) Assignee: Bender GmbH & Co. KG, Gruenberg (DE)

( * ) Notice: Subject to any disclaimer, the term of this patent is extended or adjusted under 35 U.S.C. 154(b) by 274 days.

(21) Appl. No.: 16/285,727

(22) Filed: Feb. 26, 2019

(65) Prior Publication Data
US 2019/0263285 A1    Aug. 29, 2019

(30) Foreign Application Priority Data

Feb. 28, 2018  (DE) .......................... 102018104577.8

(51) Int. Cl.
| B60L 53/62 | (2019.01) |
| B60L 53/66 | (2019.01) |
| B60L 58/12 | (2019.01) |
| B60L 53/14 | (2019.01) |

(52) U.S. Cl.
CPC .............. B60L 53/62 (2019.02); B60L 53/14 (2019.02); B60L 53/66 (2019.02); B60L 58/12 (2019.02); *B60L 2240/80* (2013.01); *B60L 2250/14* (2013.01); *B60L 2260/54* (2013.01); *B60L 2260/58* (2013.01)

(58) Field of Classification Search
CPC ...................................................... B60L 53/62
USPC ........................................................ 320/109
See application file for complete search history.

(56) References Cited

U.S. PATENT DOCUMENTS

| 2012/0245750 A1 | 9/2012 | Paul et al. |
| 2013/0278225 A1* | 10/2013 | Dietze .................... B60L 53/64 |
| | | 320/137 |
| 2015/0015213 A1 | 1/2015 | Brooks et al. |

FOREIGN PATENT DOCUMENTS

| DE | 102009043380 A1 | 4/2011 |
| DE | 102010029118 A1 | 11/2011 |
| DE | 102011008675 A1 | 7/2012 |
| DE | 112012005488 T5 | 10/2014 |

(Continued)

OTHER PUBLICATIONS

English Machine Abstract of DE112012005488T5 dated Oct. 2, 2014

(Continued)

*Primary Examiner* — Edward Tso
*Assistant Examiner* — Ahmed H Omar
(74) *Attorney, Agent, or Firm* — Dickinson Wright PLLC; Andrew D. Dorisio (57) ABSTRACT

The invention relates to a method for managing the energy demand of a charging station for an electric vehicle having an energy storage device, a charging power being supplied and controlled conductively via a charging connection line with the aim of providing a largest possible (current) control potential in order to attain grid stability for the power supply system. An anticipated parking duration and a desired energy amount are recorded as power-specific vehicle data and customer-specific data. Based on the aforementioned data, a charging plan is established which can follow different charging strategies according to the invention which dictate the temporal progress of the charging power while parking.

8 Claims, 3 Drawing Sheets

(56) References Cited

FOREIGN PATENT DOCUMENTS

| DE | 112014001783 T5 | 12/2015 |
| DE | 102016215332 A1 | 2/2018 |
| WO | 2012095129 A2 | 7/2012 |
| WO | 2013023695 A1 | 2/2013 |

OTHER PUBLICATIONS

English Machine Abstract of DE112014001783T5 dated Dec. 10, 2014.
English Abstract of WO2012095129A2 dated Jul. 19, 2012.

* cited by examiner

METHOD FOR MANAGING THE ENERGY DEMAND OF A CHARGING STATION FOR AN ELECTRIC VEHICLE

This application incorporates by reference the disclosure of German Patent Application No. 10 2018 104 577.8 filed on Feb. 28, 2018.

TECHNICAL FIELD

The invention relates to a method for managing the energy demand of a charging station for an electric vehicle having an energy storage device, a charging power being supplied and controlled conductively via a charging control line.

BACKGROUND

In the wake of the energy transition, regenerative energy carriers feed more and more electricity into the power supply system. Now nearly one out of three consumed kilowatt hours in Germany comes from wind, solar, water or bioenergy power stations. A resulting consequence is that a portion of the electricity produced in Germany has to be exported as not enough operating potential (operating reserve) is available in the country to keep the power supply system stable with regard to the mains frequency.

The set-up of a smart grid is therefore strongly promoted. In the scope of this "smart grid", it is intended to also view batteries installed in electric vehicles as energy storage devices for the power supply grid from now on.

This requires a bidirectional charging method in which a part of the storage capacity of the vehicle's energy storage device is used for charging or discharging electric energy. If there is an energy surplus in the power grid, the vehicle's energy storage device is charged. If, vice versa, a lack of energy is present, the energy storage device is discharged and the stored energy is fed into the power grid. The electric vehicles connected to the power supply system can provide positive operating reserve when feeding energy back into the grid (feeding energy into the power supply grid) as well as negative operating reserve when charging (taking energy from the power supply grid).

On the one hand, however, it will not be in the interest of the vehicle owner if their vehicle is being used by third parties as an energy storage device. To add to this, an energy storage device which is not fully charged leads to a reduced range and thus to limitations in mobility.

On the other hand, with regard to the requirements concerning the quality of the power grid, the grid operator will not allow just any vehicle to feed energy into the grid independently of one's location.

As an alternative to providing operating reserve by means of a bidirectional charging method, a unidirectional charging method is described in patent DE 10 2009 043 380 A1 which can also provide positive and negative operating reserve. Feeding energy back to the power grid from the electric vehicle hence is not required since a temporal shift of the charging method is used for providing operating reserve in the broad sense. The temporal difference of the charging time to a longer parking duration is used to vary the charging power. A positive operating reserve (taking less energy from the power supply grid) can be provided by throttling power and a negative operating reserve (taking more energy from the power supply grid) can be provided by increasing power.

However, a disadvantage of this unidirectional method is that should there be no facilities to recharge the vehicle at the destination entered into the navigation system, the remaining energy amount may not have been taken into consideration for further destinations or the drive back. Furthermore, it cannot be expected of the driver to repeatedly enter their destination as they will not be able to plan their entire day ahead in most instances.

In addition, data is sent directly to the grid operator from the communication unit in the vehicle by means of supplier gridlines. As a consequence, extensive standardization would have to be implemented for an extensive compatibility with different grid operators and vehicle manufacturers.

To add to this, further problems can arise in the known conventional solutions in the scope of the unidirectional charging method, e.g. interruption and resumption of the charging process, such as:
the desired energy amount has not been charged at the end of the parking duration,
the potential of the operating reserve is not ideally employed,
the vehicle owner has trouble with mobility if they wish to depart sooner than possible,
the intended charging method can only be used in conjunction with certain vehicle equipment,
the actual operating reserve cannot be calculated or planned,
disadvantageous entries or calculations have to be made when the parking duration and energy amount are requested.

It is therefore safe to say that a practical use of the method solutions hitherto known has not been found.

SUMMARY

It is therefore the objective of the present invention to indicate a method for charging an energy storage device of an electric vehicle which would provide a largest possible operating reserve to the power supply grid with regard to the provided energy amount and can consequently be easily realized without jeopardizing the client aim.

The term "control" is used in a superordinate sense which can encompass a purely (feed-forward) control mechanism and a feed-back system (closed-loop control).

The method according to the invention rests upon the assumption that the electric vehicle is connected to the charging station via a conductive charging system according to standard DIN EN 61851-1. Moreover, the charging station is equipped with a communication interface, or at the least with a user unit for entering data specific to the vehicle and the customer.

In a first step, power-specific data of a charging device of the electric vehicle are recorded, a charging control device and the energy storage device being understood to be relevant components of the charging device in this instance.

Besides these technical vehicle data, an anticipated parking duration $T\_K$ and a desired energy amount $E\_K$ are recorded in another step as customer-specific data. These entries represent the client aim meant to be attained under the given technical circumstances with the aim of providing a largest possible operating potential.

Further, a base supply power $P\_GS$ is determined as the lowest power threshold which corresponds to a minimum transferable power as a function of the technical equipment of the charging device of the electric vehicle and the charging station and which cannot be fallen short of during the charging progress, with the exception of an interruption in energy transferal.

In addition, a maximum charging power $P\_MAX$ is determined as the upper power threshold which is derived from the maximally transferable power of the charging station, the charger cable or the charging control device of the electric vehicle.

Based on the aforementioned data, namely the power-specific data of the charging device of the electric vehicle, the anticipated parking duration, the desired energy amount, the base supply power and the maximal charging power, a charging plan is established which describes a temporal progression of the charging power P(t) (charging progression).

According to the invention in this context, the charging plan follows a charging strategy dictating the temporal progression of the charging power for the parking duration.

Subsequently, the charging plan is implemented according to the selected charging strategy.

The method according to the invention is characterized by only technical devices of the charging station being used which already adhere to certain standards. This advantageously enables integrating nearly any electric vehicle into the power supply grid for providing operating reserve.

The only other technical prerequisite is a not fully charged energy storage device of the electric vehicle. In a one-off charging process, the energy storage device is used for providing negative operating reserve.

The customer-specific entries required for establishing a charging plan are limited to the parking duration and the desired energy amount.

By recording the customer-specific entries, the user influences the charging process. The charging station translates these entries into a charging plan under the given technical circumstances. While the charging station has control over the energy flow, it only has limited operating possibilities so that a conflict cannot arise with the customer aim agreement.

The charging plan has the advantage of there being no unwanted power peaks in the power supply during high traffic, such as during the daily rush hour. Moreover, when providing negative operating reserve according to the invention the positive effect of being able to increase the service life of the electric vehicle's energy storage device arises.

The power supply system remains stable when applying the method for managing the energy demand according to the invention, for should an electric vehicle no longer be available as an energy storage means, the shortage can be compensated at a different charging station with the aid of a power increase.

If, additionally, the charging plans of each electric vehicle are known to the grid operator, the energy flow in the grid can be foretold.

The method according to the invention as well as the communication with the grid operator or energy supplier is implemented in the charging station. The method can thus be applied independently of the electric vehicle to be charged.

In regard to attaining a maximally possible operating reserve, the charging plan follows a charging strategy which determines the progression of the charging power over the indicated parking duration with unambiguous power values and ensures that the customer aim is attained.

Three predefined charging strategies which are up for selection are proposed.

A first charging strategy corresponds to a charging strategy "base supply with ramp" and describes a progression of the charging power for the parking duration, in which the charging power remains constant from a start time of the parking duration and corresponds to the value of the base supply power until a ramp start time. At the ramp start time, a linear rising of the charging power starting from the value of the base supply power to a peak power $P\_X$ at the end time of the parking duration follows.

The linear rising is determined by a straight line which runs through the origin of the charging plan diagram.

A second charging strategy corresponds to a charging strategy "deferred base supply" and describes a progress in which the energy transferal is initially deferred to a base-supply start time. From the base-supply start time, the charging power progresses on the level of the base supply power for the remaining parking duration until the parking duration is terminated.

A third charging strategy corresponds to a charging strategy "average value" and describes a progression in which the desired energy amount is distributed evenly over the parking duration so as to yield a constant average charging power $P\_AVG$ for the parking duration for the temporal progression of the charging power.

If an average charging power is yielded which is smaller than the base supply power, this charging strategy cannot be implemented as the base supply power cannot be exceeded. In this instance, the second charging strategy "deferred base supply" is to be implemented.

If an average charging power is yielded which is larger than the maximal charging power, (only) the maximal charging power is supplied for the parking duration. In this instance, the desired energy amount is not attained within the parking duration. A negative operating reserve is not attained.

When establishing the charging plan, one of the three predefined charging strategies is selected according to a specified decision schedule. As a result of the decision, the charging strategy is selected for application which shows the largest possible potential for providing operating reserve under the given technical circumstances and fulfills the user requirements (customer aim).

For selecting a suitable charging strategy, the information of the system describing the power, i.e. the base supply power, is required for the lower power threshold and the maximal charging power is required as the upper power threshold and the customer-specific data parking duration and energy amount are required.

In a first condition it is examined whether the desired energy amount is larger than the product of the base supply power and the parking duration. If this condition is not fulfilled, the desired energy amount can be transferred with a constant charging power in a shorter duration than the parking duration corresponding to the base supply power. The energy transferal will thus commence with some delay at a base-supply start time with the value of the base supply power according to the second charging strategy.

If the first condition is fulfilled, the straight line which specifies the linear rising of the charging power is calculated bearing the aim of applying the first charging strategy in mind.

To attain the customer aim, it results from a power-time-area consideration that the additional energy effected by the linear rising (triangular area between the line of the base supply power and the straight line) has to yield the desired energy amount in conjunction with the energy effected by the constant base supply power (rectangular area below the line of the base supply power).

The gradient of the straight line can be determined based on the assumption that the straight line runs through the origin of the charging plan. From the intersection of the straight line with the line of the base supply power, the ramp start time and the charging power, which is to be delivered at the end time of the parking duration as a peak power, are resulting.

In a second condition it is now examined whether this peak power is larger than the maximal charging power.

If this condition is not fulfilled, the power is controlled starting from the ramp start time according to the calculated straight line—the first charging strategy "base supply with ramp" is consequently implemented.

If, however, this second condition is fulfilled, the second charging strategy cannot be implemented due to the foreseeable power exceedance and the third charging strategy "average value" is applied.

The possibility of a permanent charging using the base supply ensures on the one hand that the electric vehicle has access to a minimal energy amount even after a shortened parking duration—the exception being the charging strategy of deferred base supply. This comes to use in the event that a very low energy amount is wanted over a larger period of time. In this instance, owing to the small energy amount, it can be assumed that this is only a recharge. The vehicle already has a charged energy amount, meaning no mobility problem will occur.

Moreover, the user is not confused by a message stating "disrupted charging" as the charging process was not disrupted. This could otherwise lead to the user avoiding charging stations having energy controls in future.

The storage capacity of the energy storage device, the charging state of the energy storage device and power-specific data of the charging control device installed in the electric vehicle are recorded as power-specific data of the charging device of the electric vehicle.

The power-specific data of the charging device of the electric vehicle and/or the customer-specific data are recorded either via an installed communication channel or via manual input through the user. The communication channel between the charging control device of the electric vehicle and the charging station can be configured according to the standard IEC 15118 as a "power line communication".

Should no communication channel be installed, the power-specific data of the charging control device installed in the electric vehicle are recorded by means of a precursory charging method in the following steps: commencing a charging process using a charging power corresponding to a minimal value of a current flow in an outer conductor; measuring a first charging power; detecting the base supply power as a lower threshold and the number of the outer conductors used for charging from the first measured charging power; increasing the charging power to an available largest charging power which is specified or limited by the charging station; and measuring a second charging power. If the measured second charging power is larger than the base supply power, the second measured charging power is used as the maximal charging power. Otherwise, the maximal charging power is to be equalized to the base supply power.

In this manner, the lower and the upper power threshold can be detected if there is no possibility of requesting the power-specific data of the charging device of the electric vehicle.

In the same manner, should no communication channel be installed, the customer-specific data can be recorded such that a desired energy amount corresponding to the desired range increase and a desired departure time can be input manually at the charging station for calculating the anticipated parking duration.

BRIEF DESCRIPTION OF THE DRAWINGS

Further advantageous features of embodiments can be derived from the following description and drawings which describe a preferred embodiment of the invention by means of examples. In the following.

DETAILED DESCRIPTION

Figure 1:
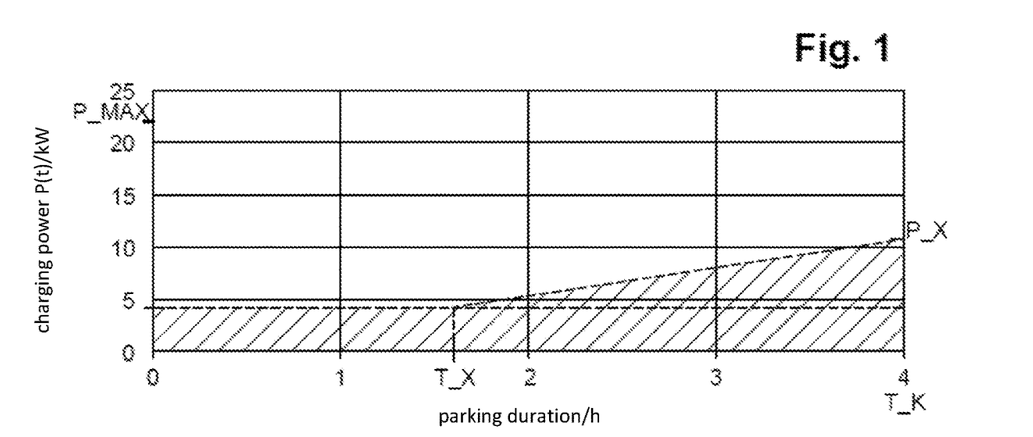
FIG. 1 illustrates a charging plan according to the first charging strategy "base supply with ramp"

In FIG. 1, the first charging strategy "base supply with ramp" is illustrated.

The charging power P(t) is kept on the level of the base supply power P_GS at the start so that a maximally possible power increase can be attained as a negative operating power (operating potential) during the parking duration. In order to counteract the risk of not being able to maintain the customer aim by only providing base supply power P_GS, the charging power P(t) is continually increased by a linear rising starting at a ramp start time T_X as the parking duration progresses until the peak power P_X is attained at the end time of the parking duration T_K. In an imaginative extension, the line which describes this linear rising is to run through the origin of the coordinate system on which the charging plan is based in an imaginative extension. The gradient of the straight line is predetermined by the increased energy amount resulting from the rising, the ramp start time T_X and the peak power P_X at the end time of the parking duration T_K being yielded as an intersection with the line of the base supply power P_GS.

EXAMPLE

A customer (user) parks the electric vehicle presuming a parking duration T_K of four hours in order to consume the desired energy amount E_K of 25 kWh. A charging via a three-phase charging facility is assumed, whereby a base supply power P_GS of 4.14 kW is yielded, under the prerequisite of a grid voltage of 230 V and an amperage of 6 A per outer conductor (phase).

The strategy "base supply with ramp" commences the charging using the base supply power P_GS of 4.14 kW and upholds this value as the charging power P(t) until the ramp start time T_X. From the ramp start time T_X, the charging power P(t) is increased to the peak time P_X at the end time of the parking duration T_K following a linear rising.

The base supply power P_GS alone covers an energy demand amounting to 16.56 kWh over the parking duration T_K. The area of the triangle limited by the straight line and disposed above the base supply power P_GS corresponds to an additional energy amount of 8.44 kWh in order to attain the desired energy amount E_K of 25 kWh in total.

The progression of the charging power P(t) changes at the ramp start time T_X=1.51 h and reaches a peak power P_X of 10.93 kW at the end time of the parking duration T_K=4 h.

When calculating the straight line, the peak power P_X can exceed the value of the maximal charging power P_MAX at the end time of the parking duration T_K. However, the charging power P(t) is limited to the value of the maximal charging power P_MAX by the technical properties of the charging station and the charging control device. On physical grounds, it is not possible to transfer the calculated peak power P_X. For this reason, the strategy "average value" is applied instead of the charging strategy "base supply with ramp".

Figure 2:
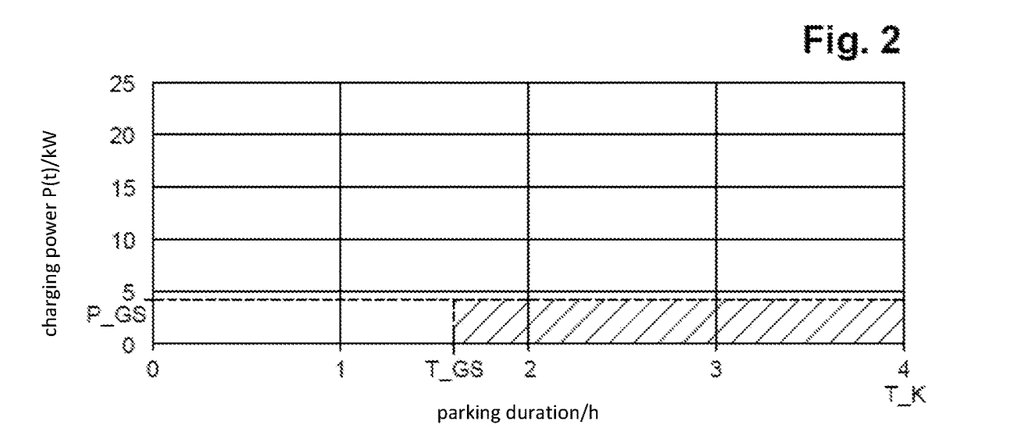
FIG. 2 illustrates a charging plan according to the second charging strategy "deferred base supply"

FIG. 2 illustrates a charging plan according to the second charging strategy "deferred base supply".

Should the average charging power P_AVG be less than the base supply power P_GS, the energy amount to be supplied is to be distributed over a shorter period of time because the base supply power P_GS represents a lower threshold for the charging power P(t) which cannot be fallen short of.

The charging start is deferred to a later base supply start time T_GS, starting from which the desired energy amount E_K is attained over a remaining parking duration via the base supply power P_GS.

The base supply start time T_GS is derived from $$T\_GS = T\_K - (E\_K/P\_GS).$$

EXAMPLE

The customer parks the electric vehicle presuming a parking duration T_K of four hours in order to consume the desired energy amount E_K of 10 kWh.

The average charging power P_AVG therefore is 2.5 kW and is below the value of the three-phase base supply power P_GS of 4.14 kW.

The start time of the charging is therefore deferred to the base-supply start time T_GS=1.58 h, starting from which the charging commences over a remaining parking duration T_K−T_GS=2.42 h having the base supply power P_GS=4.14 kW in order to supply the desired energy amount E_K=10 kWh.

Figure 3:
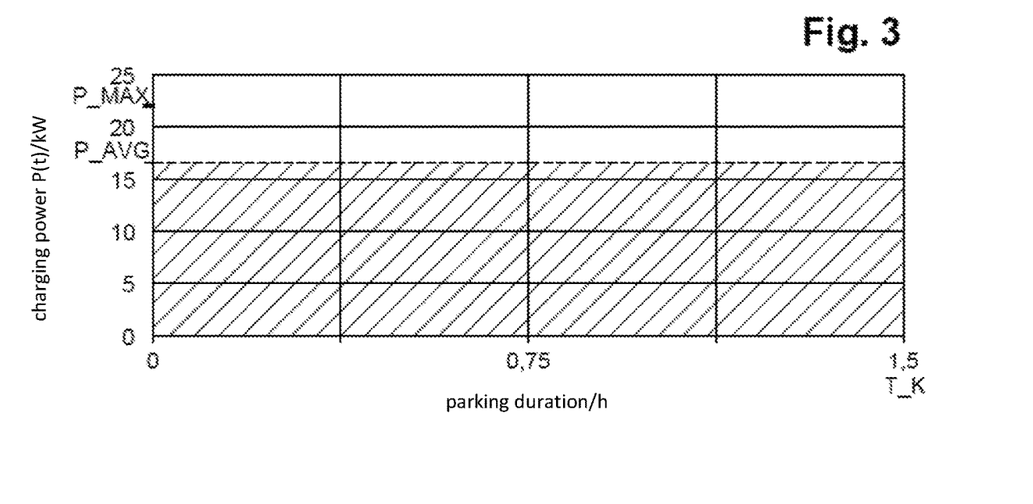
FIG. 3 illustrates a charging plan according to the third charging strategy "average value"

In FIG. 3, a charging plan is illustrated according to the third charging strategy "average value".

For determining the average charging power P_AVG, the desired energy amount E_K is distributed equally over the parking duration T_K according to P_AVG=E_K/T_K.

This average charging power P_AVG is used for charging during the parking duration T_K.

Two exceptions are to be noted: if the average charging power P_AVG is less than the base supply power P_GS, the second charging strategy "deferred base supply" has to be implemented since the base supply power P_GS cannot be fallen short of.

If the average charging power P_AVG is larger than the maximal charging power P_MAX, the desired energy amount cannot be attained and the customer aim cannot be fulfilled. Thus, a negative operating reserve cannot be made available.

The maximally possible energy amount is made available by the maximal charging power P_MAX being transferred during the parking duration T_K.

EXAMPLE

The customer parks the electric vehicle presuming a parking duration T_K of one and a half hours to consume the desired energy amount E_K of 25 kWh.

The charging device of the electric vehicle disposes over a three-phase charging control device having a power of 22 kW. The power of the charging control device is to be set as the maximal charging power P_MAX (upper power threshold).

The average charging power P_AVG is 16.67 kW and is therefore between the base supply power P_GS of 4.14 kW and the maximal charging power P_MAX of 22 kW.

Figure 4:
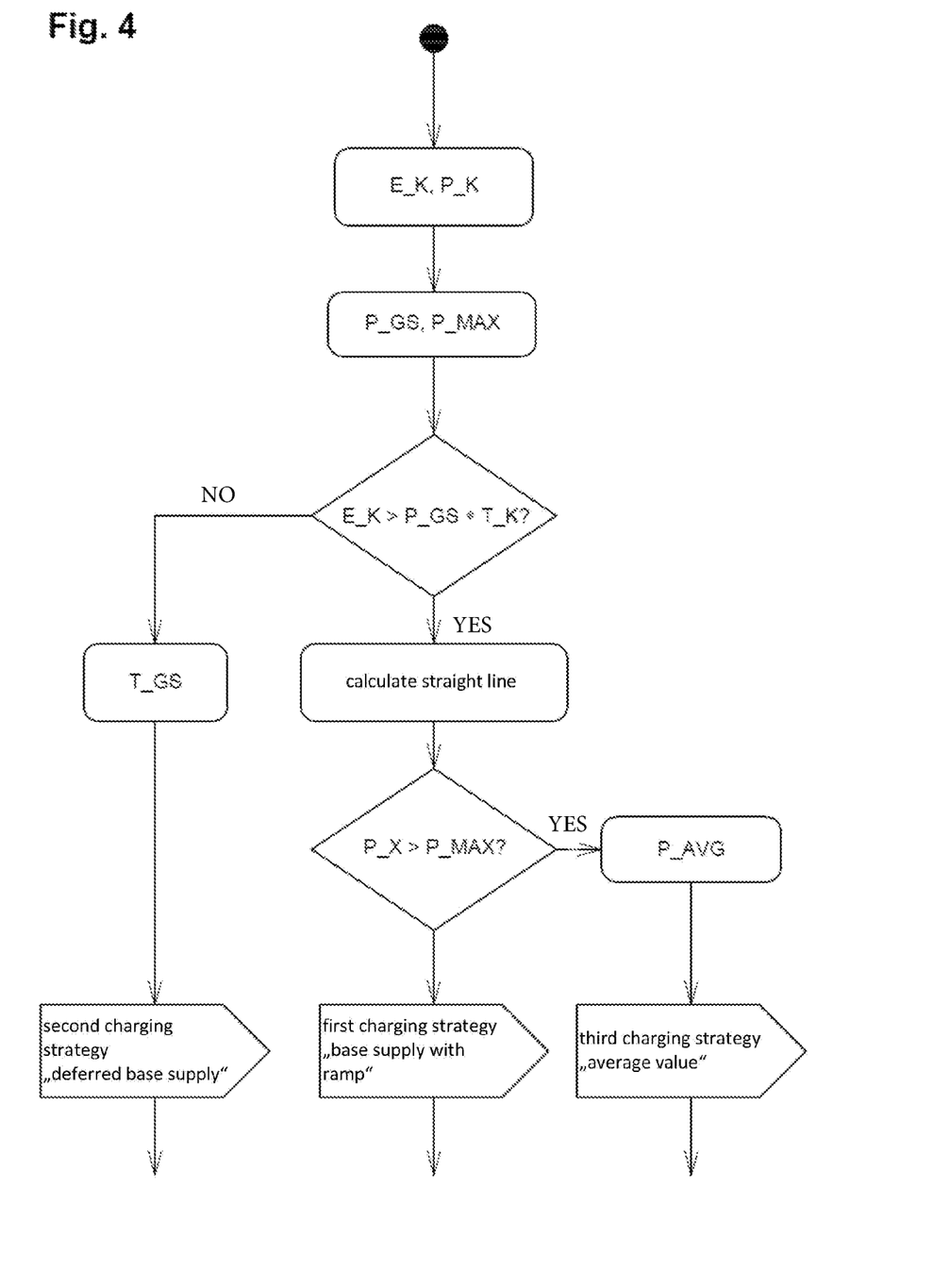
FIG. 4 illustrates a decision schedule for establishing a charging plan.

FIG. 4 illustrates a decision schedule for establishing a charging plan.

Assuming that the user entries regarding the desired energy amount E_K and the anticipated parking duration T_K are available, the base supply power P_GS is first detected as the lower power threshold and the maximal charging power P_MAX is detected as the upper power threshold.

For determining the lower power threshold, the smallest possible charging power is made available to the electric vehicle at the beginning of the charging process. By means of the power consumption, the number of outer conductors used by the vehicle and from this the value of the base supply power P_GS can be determined.

Without interrupting the charging process, the largest possible charging power is made available to the vehicle subsequent to determining the upper power threshold. By means of the power consumption, the maximal charging power P_MAX is determined.

If the boundary conditions determining the charging progression are fixed, one of the three charging strategies is chosen in a two-step decision process.

In a first condition, it is examined whether the first charging strategy "base supply with ramp" can be implemented. For this, it has to be examined whether the desired energy amount E_K is larger than the product from the anticipated parking duration T_K multiplied by the base supply power P_GS.

If this is not the case, the second charging strategy of deferred base supply has to be applied for establishing the charging plan so as to not fall short of the base supply power P_GS.

If, however, the desired energy amount E_K is larger than the product of the anticipated parking duration T_K and base supply power P_GS, it needs to be decided whether the first charging strategy "base supply with ramp" or the third charging strategy "average value" should be applied.

After calculating the linear equation in a second condition, it therefore needs to be examined whether the peak power P_X derived from the linear equation exceeds the maximal charging power P_MAX.

If this second condition is fulfilled, the third charging strategy "average value" is implemented. The average charging power P_AVG is then calculated from the desired energy amount E_K and the parking duration T_K.

If this second condition is not fulfilled, i.e. if the peak power P_X is below the maximal charging power P_MAX at the end time of the parking duration, the first strategy "base supply with ramp" can be implemented.

Figure 5:
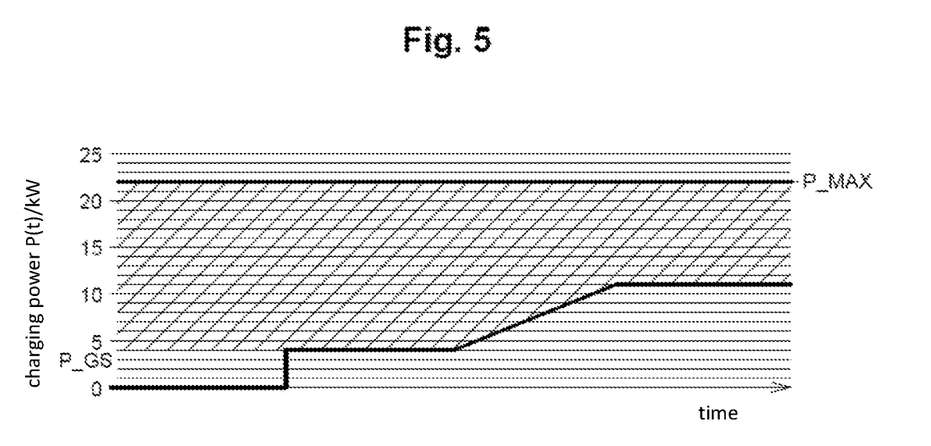
FIG. 5 illustrates a hypothetical charging plan having operating thresholds.

FIG. 5 illustrates a theoretical charging plan having operating limits.

The operating range is derived from the charging plan and the maximal charging power P_MAX. The operating range shows the negative operating power over time. The lower operating threshold is determined by the base supply power P_GS or by the charging power P(t) given by the charging plan.

The lower operating threshold can take on the value zero, for example when the charging process is deferred; increasing the power from the value zero, however, is possible to only precisely or over the base supply power P_GS.

The upper operating threshold of the charging power is at the technical maximum, described by the maximal charging power P_MAX which is limited by the charging connection line, the circuit breakers or the charging control device.

The diagram is a hatched illustration of the operating range in an arbitrary charging plan having a base supply power of 4.14 kW and the maximal charging power P_MAX of 22 kW.

The charging plan helps maintain customer specifications, the operating power being provided between the planned charging power and the maximal charging power.

If a charging station is equipped with the method according to the invention, i.e. the charging plan is known, information on the available negative operating reserve can be transmitted directly to the energy supplier or a third party by means of suitable communication interfaces. The data of several decentralized charging stations can be collected centrally in a virtual power plant. This power plant can be scaled such that operating reserves can be realistically provided in the power supply grid up to the megawatt range.

If a charging station is capable of implementing the method and disposes over corresponding communication interfaces, every charging station operator can take up communication with the operator of the virtual power plant. The charging station will connect with the server of the power plant and will request from the server to initiate a session for operating reserves at the beginning of every charging process. The session will be maintained for the duration of the charging process.

Once a session is initiated, the charging station records the vehicle data and establishes the charging plan as described. The charging plan is transmitted to the virtual power plant. The power volume is thus defined over the entire charging time.

The vehicle is charged according to the power progression defined in the charging plan. Thus, the desired energy amount is ensured in the vehicle at the end of the parking duration. The virtual power plant has the possibility of increasing the charging power decisively to P_MAX during the parking duration and thus using the negative operating reserve.

A session with the virtual power plant is terminated once the vehicle has been charged with the desired range increase according to the energy amount. A session can also be terminated if the charging process has been interrupted. The charging process can be interrupted manually by the vehicle owner, for example, if they wish to leave the charging station before the anticipated parking time has been terminated.

The invention claimed is:

1. A method for managing the energy demand of a charging station for an electric vehicle having an energy storage device, a charging power (P(t)) being supplied and controlled conductively via a charging connection line, comprising the following method steps:
    recording power-specific data of a charging device of the electric vehicle,
    recording an anticipated parking duration (T_K) and a desired energy amount (E_K) as customer-specific data,
    determining an average charging power (P_AVG) according to P_AVG=E K/T K
    determining a base supply power (P_GS) and a maximal charging power (P_MAX),
    establishing a charging plan describing a temporal progression of the charging power (P(t)) as a function of the power-specific data of the charging device of the electric vehicle, of the anticipated parking duration (T_K) and the desired energy amount (E_K) and of the base supply power (P_GS) and the maximal charging power (P_MAX),
    said charging plan following a charging strategy dictating the temporal progression of the planned charging power (P(t)),
    implementing the charging plan according to the selected charging strategy; wherein a first charging strategy is selected as a charging strategy in which the charging power (P(t)) from a start time (t=0) of the parking duration to a ramp start time (T_X) corresponds to the base supply power (P_GS) and rises on a straight line to a peak power (P_X) at the end time of the parking duration (T_K) starting from the base supply power (P_GS) at the ramp start time (T_X), said rising straight line extending through the origin of the charging plan, or a second charging strategy is selected as a charging strategy in which the charging power (P(t)) at a start time (t=0) of the parking duration to a base supply start time (t=T_GS) is zero and progresses constantly starting from the base supply start time (T_GS) to the termination of the parking duration (TK) and corresponds to the base supply power (PGS), or a third charging strategy is selected as a charging strategy in which the desired energy amount (EK) is distributed equally over the parking duration (T_K) so as to yield the average charging power (P_AVG), which is constant for the parking duration (T_K), for the temporal progression of the charging power (P(t)).

2. The method according to claim 1, characterized in that if the average charging power (P_AVG) is smaller than the base supply power (P_GS), the second charging strategy is to be implemented.

3. The method according to claim 1, characterized in that if the average charging power (P_AVG) is larger than the maximal charging power (P_MAX), the maximal charging power (P_MAX) is supplied for the parking duration (T_K), while the desired energy amount (E_K) is not achieved.

4. The method according to claim 1, characterized in that the charging strategy for establishing the charging plan is selected in the following steps:
    examining in a first condition whether the desired energy amount (E_K) is larger than the product of the base supply power (P_GS) and parking duration (T_K),
    if the first condition is not fulfilled, the base supply start time (T_GS) is determined and the second charging strategy is implemented,
    if the first condition is fulfilled, the rising straight line, which describes the increase of the charging power (P(t) for t>T X), is calculated such for examining the applicability of the first charging strategy that the desired energy amount (E_K) can be supplied during the parking duration (T_K), the ramp start time (T_X) being yielded from the intersection of the horizontal line of the constant base supply power (P_GS) with the calculated rising straight line,
    examining in a second condition whether the peak power (P_X) yielded from the calculated straight line is larger than the maximal charging power (P_MAX) at the end time of the parking duration (T_K),
    if the second condition is not fulfilled, the first charging strategy is applied
    if the second condition is fulfilled, the average charging power (P_AVG) is determined and the third charging strategy is implemented.

5. The method according to claim 1, characterized in that the storage capacity of the energy storage device, the charging state of the energy storage device and power-specific data of a charging control device installed in the electric vehicle are recorded as power-specific data of the charging device of the electric vehicle.

6. The method according to claim 1, characterized in that the power-specific data of the charging device of the electric vehicle and/or the customer-specific data are transmitted to the charging station via an installed communication channel.

7. The method according to claim 1, characterized in that if no communication channel is installed, the power-specific data of the charging control device installed in the electric vehicle is recorded by     starting a charging process with a charging power corresponding to a smallest value of a current flow to be set in an outer conductor,     measuring a first charging power,     detecting the base supply power (P_GS) as the lowest power threshold and the number of the outer conductors, which are intended to be used for charging, from the first measured charging power,     increasing the charging power to an available largest charging power predetermined by the charging station,     measuring a second charging power,     if the second measured charging power is nearly equal to the first measured charging power, the base supply power (P_GS) is to be set as the maximal charging power (P_MAX),     if the second measured charging power is larger than the first measured charging power, the second measured charging power is to be set as the maximal charging power (P_MAX).

8. The method according to claim 1, characterized in that if no communication channel is installed, the customer-specific data is recorded such that a desired energy amount (E_K) corresponding to the desired range extension and a desired departure time is input manually by the vehicle operator at the charging station for calculating the anticipated parking duration (T_K).

\* \* \* \* \*

UNITED STATES PATENT AND TRADEMARK OFFICE
CERTIFICATE OF CORRECTION

PATENT NO. : 11,097,630 B2
APPLICATION NO. : 16/285727
DATED : August 24, 2021
INVENTOR(S) : Steffen Freitag Page 1 of 1

It is certified that error appears in the above-identified patent and that said Letters Patent is hereby corrected as shown below:

In the Claims

Column 10, Claim 1, Line 22: please replace "(TK)" with -- (T_K) --

Column 10, Claim 1, Line 23: please replace "(PGS)," with -- (P_GS), --

Column 10, Claim 1, Line 25: please replace "(EK)" with -- (E_K) --

Column 10, Claim 4, Line 50: please replace "(P(t) for t>T X)," with -- (P(t) for t>T_X), --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*